Nov. 30, 1943.         C. C. CANTIN         2,335,387
APPARATUS FOR CEMENTING WELLS
Filed June 26, 1940         2 Sheets-Sheet 1

INVENTOR,
CLYDE C. CANTIN.
BY Robert M. McManigal
ATTORNEY

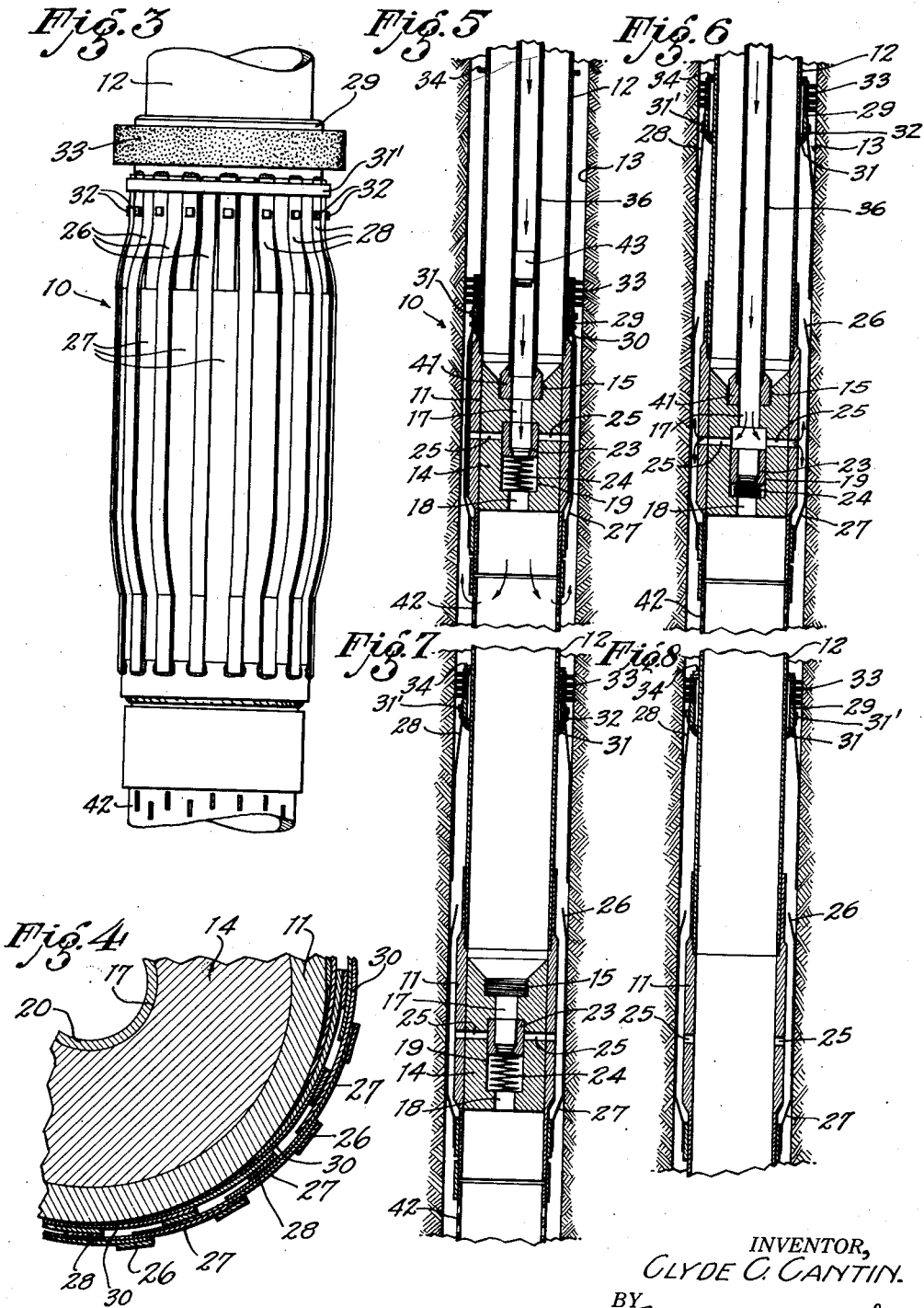

Patented Nov. 30, 1943

2,335,387

UNITED STATES PATENT OFFICE 2,335,387

APPARATUS FOR CEMENTING WELLS

Clyde C. Cantin, Long Beach, Calif., assignor of one-half to Henry McRae Oliver, Long Beach, Calif.

Application June 26, 1940, Serial No. 342,515

8 Claims. (Cl. 166—1)

This invention relates to apparatus for cementing oil well casings.

Oil operators have experienced much difficulty and expense in effecting cementing operations due to their inability to:

(a) Remove mud cake from the walls of the hole, which mud prevents a bond between the cement and the formation, (b) Prevent channeling of the cement through the mud surrounding the casing, (c) Prevent the mud surrounding the casing from contaminating the cement, (d) Keep the pipe centered in order to allow the cement to completely surround the casing, (e) Maintain pressure on the cement in position between the formation and the casing until the cement hardens.

The object of my invention is to provide apparatus for cementing wells which overcomes the disadvantages of the prior methods and means, and particularly the disadvantages set forth hereinabove.

Another object of my invention is to provide apparatus which overcomes all of the above disadvantages in one continuous cementing operation.

Another object of my invention is to provide a cement retaining basket around the casing which is adapted to be raised as cement is pumped through the casing, thereby forcing all mud away, and leaving only pure cement.

Another object of my invention is to provide a cementing device which may be raised and lowered at will until the cementing operations are commenced.

Another object of my invention is to provide a valve for opening and closing the cementing ports in the cementing device which valve also separates the drilling fluid from the cement.

Another object of my invention is to provide telescoping cement retaining baskets, means for maintaining said baskets in normal or closed position, and means for opening said baskets.

Another object of my invention is to provide a means for cleaning the mud from the formation.

My invention has many other objects, advantages, and features, some of which, with the foregoing, will be set forth in the following description where I shall outline one form of my invention which I have selected for illllustration in the drawings accompanying and forming a part of the present specification.

Referring to the drawings:

Figure 3 is a side elevation of the cementing device in normal position.

Figure 4 is an enlarged fragmentary transverse section taken on the line 4—4 of Fig. 3.

Figures 5, 6, 7 and 8 are successive positions of the cementing device in operation.

Figure 1:
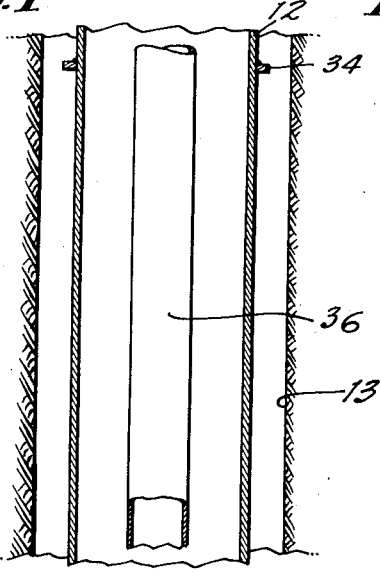
Figure 1 is a transverse section of the cementing device in normal position.

Referring to said drawings, the numeral 10 indicates the cementing device of my invention which comprises means for including said device in a well casing, means for attaching said device to a well string, cement discharge ports, means for opening and closing said discharge ports, a fixed cement retaining means, and a movable cement retaining means.

The cementing device 10 is provided with a collar 11 which is adapted to be secured to adjacent parts of a string of well casing which is received in the well bore 13. The collar 11 is preferably made of metal and is provided with a tubular extension at its upper end. The inside 14 of the cementing device is made of frangible material and is provided with threads 15 so that a cementing mandrel sub may be threaded thereto, circulation bores 17 and 18 and an enlarged bore 19. Circulation tubes 20 and 21 made of drillable alloy are provided in the bores 17 and 18 respectively. Mounted in the enlarged bore 19 are sleeve 22, valve 23 and compression spring 24, all of which are made of drillable alloy. Cement discharge ports 25 are provided through the sleeve 22, inside portion 14 and collar 11.

The cement retaining means may be of the form generally known as "petal" baskets, which consist of overlapping thin petal-like members which overlap each other so that they maintain a continuous side wall at all times. The petal-like members are reinforced by relatively thin leaf springs.

As shown in the drawings, the movable or inverted cement retaining means may be telescoped within the fixed cement retaining means. The springs 26 of the fixed cement retaining means are secured to the casing and extend beyond the petals 27.

The springs 28 of the movable cement retaining means are secured to a movable sleeve 29 which surrounds the tubular extension of the collar 11. The springs 28 reinforce and extend beyond the petals 30 of the movable cement retaining means. Secured to the lower end of the movable sleeve 29 and surrounding the tubular extension is a reinforced rubber sealing ring 31 which is adapted to prevent any fluid from passing between the well casing 12 and the lower end of said movable sleeve 29. As clearly shown in the drawings the tubular extension of the collar 11 facilitates the assembly of the cementing device 10 with the casing 12.

The cement retaining means are adapted to be held in normal or closed position by means of a ring 31' which surrounds the upper ends of the springs 26 of the fixed cement retaining means.

Means are provided for releasing the cement retaining means as the movable cement retaining means rises in the well bore. As an instance of this arrangement, lugs 32 may be provided on the outside of certain of the springs 28 so that as the movable sleeve 29 arises, the lugs 32 contact the lower part of the ring 31' and raise it, thereby releasing the upper ends of the springs 26 of the fixed cement retaining means.

Means for cleaning the mud from the formation may also be provided. The form of said means shown in the drawings is that of scratchers or wires 33.

A stop 34 is provided on the outside of the well casing 12 at the upper limit of where cement is to be pumped between the casing and the formation.

A cementing mandrel 35 is secured to the lower end of a well string 36 in such a manner that the well string may be longitudinally moved with respect to said mandrel. An instance of this arrangement is shown in the drawings in which a cylinder 37 having an inwardly extending flange 38 at its lower end is secured to the lower end of the well string. The cementing mandrel 35 is provided with a radial flange 39 at its upper end, a longitudinally extending rib or key 40 and a cementing mandrel sub 41 at its lower end. The cementing mandrel sub is provided with threads which are adapted to engage the threads 15 of the cementing device 10. The above construction facilitates the operation of threading the cementing mandrel sub 41 in the threads 15 of the cementing device 10.

The operation of the cementing device is as follows:

After the cementing mandrel sub 41 is threaded into the cementing device 10, drilling fluid is circulated down through the well string 36, circulation tubes 20 and 21 of the cementing device 10, out through the slotted casing 42 and up around the outside of the well casing 12.

Figure 2:
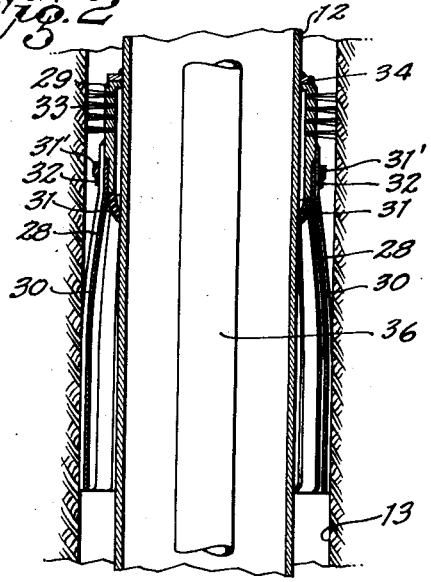
Figure 2 is a transverse section of the cementing device in expanded position.
Figure 2:
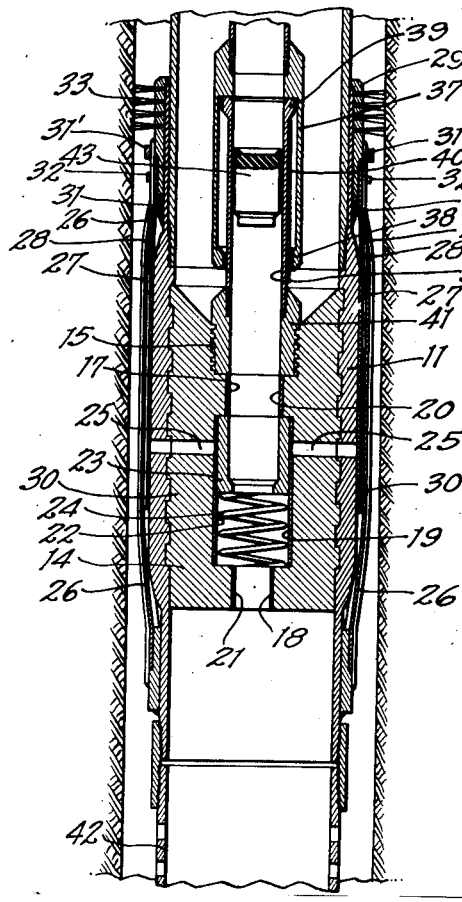
Figure 2:
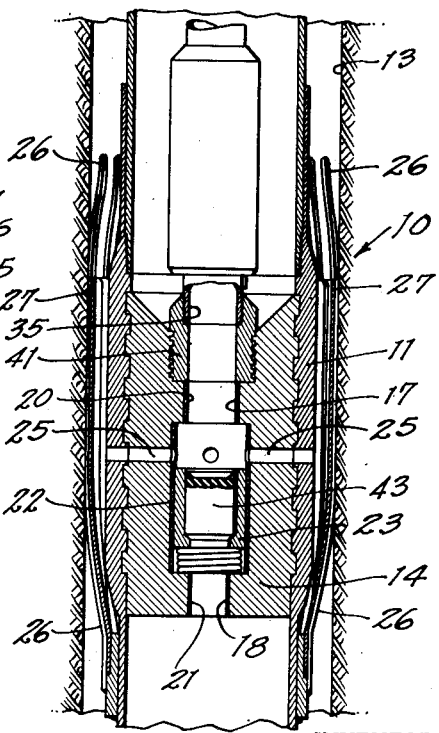

As shown in Figure 5, a fluid separation plug 43 is then lowered in the well string and cement is pumped in on top of said plug. As shown in Figure 6, the plug 43 forces the valve 23 down against the action of the spring 24, thereby allowing the cement to flow out through the discharge ports 25, thereby forcing the movable cement retaining means to move upwardly. As said movable cement retaining means moves upwardly, the lugs 32 on the outside of springs 28 contact the ring 31' and raise it, thereby releasing the upper ends of the springs 26 of the fixed cement retaining means and forcing said means into expanded position as shown in Figures 2 and 6.

The cement forces the movable sleeve 29 and the movable retaining means to rise around the casing, forcing all drilling fluid up ahead of it, and maintaining separation between the drilling fluid and the cement.

The wires 33 scratch the formation and clean the mud from it.

The movable basket continues to rise during the cementing operation until the movable sleeve 29 contacts the stop 34, after which so-called "squeeze" pressure is applied.

As soon as the pressure in the well string is released, the spring 24 forces the valve 23 and the plug 43 upward, thereby closing the cement discharge ports 25, preventing the fluid from flowing in either direction, and maintaining the pressure on the cement in position between the well casing and the formation until the cement hardens. This is a very desirable feature.

The cementing mandrel sub 41 is then withdrawn from the cementing device 10 by rotating the well string after which the well string is withdrawn from the casing, leaving the device in the position shown in Figure 7.

After the cement hardens, the body 14, plug 43, valve 23, sleeves 20, 21 and 22 and spring 24 are drilled out, leaving the well in the position shown in Figure 8.

From the foregoing description taken in connection with the accompanying drawings, the uses, advantages, and operation of my invention will be readily understood by those skilled in the art to which the invention appertains. While I have described the principle of operation together with the form of my invention which I now consider to be the best embodiment thereof, I desire to have it understood that the form shown is merely illustrative and that the invention is not to be limited to the details disclosed herein, but is to be accorded the full scope of the appended claims.

I claim:

1. Well cementing means comprising a casing, a port opening through the side walls of said casing, a valve in said means adapted to control the passage of fluid through said port, and a cement retaining means surrounding and adapted to be longitudinally moved on said casing.

2. Well cementing means comprising a casing, a port opening through the side walls of said casing, a valve in said means adapted to control the passage of fluid through said port, a cement retaining means surrounding and secured to said casing and a cement retaining means surrounding and adapted to be longitudinally moved upwardly on said casing as cement is pumped through said port in order to maintain separation between said cement and the fluid surrounding said casing.

3. Well cementing means comprising a casing, a port opening through the side wall of said casing, a valve in said means adapted to control the passage of fluid through said port, a sleeve surrounding and adapted to be longitudinally moved on said casing, a cement retaining means attached to said sleeve, said cement retaining means being adapted to maintain separation between said cement and the fluid in place between said casing and the formation, and means attached to said movable sleeve adapted to scratch the formation in order to clean the mud from said formation.

4. Well cementing means comprising a casing, a port opening through the side wall of said casing, a valve in said means adapted to control the passage of fluid through said port, a cement retaining means surrounding and adapted to be longitudinally moved on said casing as cement is pumped through said port in order to maintain separation between the cement and the fluid surrounding the casing, and means for maintaining the cement under pressure in place between the casing and the formation until the cement hardens.

5. Well cementing means comprising a casing, a port opening through the side walls of said casing, means adapted to control the passage of fluid through said port, and a pair of cooperating cement retaining means surrounding said casing, one of said retaining means being adapted to be longitudinally moved as cement is pumped through said port in order to maintain separation between said cement and the fluid surrounding said casing, means for holding said cooperating cement retaining means in closed position, and means for releasing said holding means as said movable retaining means is moved with respect to the other of said retaining means.

6. Well cementing means comprising a casing, a sleeve surrounding and slidably mounted on said casing, and a cement retaining scratcher means attached to said sleeve, said sleeve and said cement retaining means being adapted to be longitudinally raised by fluid pressure.

7. Well cementing means comprising a casing, a sleeve surrounding and slidably mounted on said casing, and a cement retaining means attached to said sleeve, scratcher means attached to said movable sleeve adapted to contact the wall of the well bore in order to clean mud from said wall, said sleeve, said cement retaining means, and said scratcher means being adapted to be longitudinally raised by fluid pressure.

8. Well cementing means comprising a casing, a sleeve surrounding and slidably mounted on said casing, and scratcher means attached to said movable sleeve adapted to contact the wall of the well bore in order to clean mud from said wall, said sleeve and said scratcher means being adapted to be longitudinally raised by fluid pressure.

CLYDE C. CANTIN.